United States Patent [19]

Weber

[11] Patent Number: 5,603,474
[45] Date of Patent: Feb. 18, 1997

[54] ADJUSTABLE SUPPORT FOR HOBBYIST

[76] Inventor: George E. Weber, 65 Brewster Cir., Hanover, Pa. 17331

[21] Appl. No.: 441,753

[22] Filed: May 16, 1995

[51] Int. Cl.[6] .................................................. A45D 19/04
[52] U.S. Cl. ............... 248/127; 248/346.02; 248/346.07; 269/79; 269/130; 269/296; 269/902
[58] Field of Search .................................. 269/130, 131, 269/296, 79, 902; 248/127, 150, 154, 176.1, 176.3, 346.06, 346.07, 346.02, 354.4, 354.5, 499, 505, 279.1, 285.1, 286.1, 287.1; 446/429

[56] References Cited

U.S. PATENT DOCUMENTS

| | | | |
|---|---|---|---|
| 568,543 | 9/1896 | Parks | 269/902 X |
| 1,164,395 | 12/1915 | Reiselt | 269/296 |
| 1,363,478 | 12/1920 | Lyon | 269/296 |
| 1,740,021 | 12/1929 | Junbers | 269/296 |
| 1,792,612 | 2/1931 | Staley | 269/296 |
| 2,256,556 | 9/1941 | Gibbons | 248/127 |
| 2,636,597 | 4/1953 | Hinz | 248/346.04 X |
| 2,783,367 | 2/1957 | Locke | 248/287.1 X |
| 4,191,357 | 3/1980 | Nesbitt | 269/296 X |
| 4,390,309 | 6/1983 | Fangmann | 269/902 X |
| 5,400,993 | 3/1995 | Hamilton | 248/279.1 |

*Primary Examiner*—Korie Chan
*Attorney, Agent, or Firm*—Gerard F. Dunne, Esq.

[57] ABSTRACT

An adjustable support for holding models in a working position for a hobbyist includes a quadrilateral frame having opposed side walls and opposing end walls which are each adjustable. The end walls and the side walls have overlapping portions having aligned longitudinal slots which can receive a securing pin so that the length, as well as the pitch of the walls, can be adjusted.

8 Claims, 3 Drawing Sheets

ADJUSTABLE SUPPORT FOR HOBBYIST

FIELD OF THE INVENTION

The present invention relates to a support to hold a model in a suitable working position for a hobbyist. The support of the present invention is simple in construction and readily adjustable to enable the hobbyist to secure many different types of models in an appropriate working position.

BACKGROUND OF THE INVENTION

Many hobbyists work with different types of models; and very often hobbyists creating models of airplanes, ships, cars and the like must secure the model in different working positions for tasks requiring detailed precision. Any device to secure a model for such details as gluing small pieces into position or painting the model must be adaptable readily so as to be useful with models of varying types, design and sizes. It is, therefore, an object of the present invention to provide a support for a hobbyist which is simple in construction and yet readily adjustable so that a hobbyist can, in a rather simple way, hold any typical model in various working positions to enable detailed tasks to be performed confidently.

SUMMARY OF THE INVENTION

According to the present invention, an adjustable support for a hobbyist for holding models in a working position includes a quadrilateral frame formed by opposing side walls and opposing end walls. The side walls and end walls of the quadrilateral frame each have respective overlapping portions carrying aligned longitudinal slots. The aligned slots can receive a securing pin so that the lengths of the side walls or end walls can be varied easily by the hobbyist. The use of aligned slots containing a securing pin enables the end walls or side walls to be pivoted about the pin so that the pitch of their overlapping portions, relative to one another, can also be adjusted to assure that models for various designs can be held securely in a selected position by the hobbyist.

Additionally, the side walls may have aligned openings for receiving a dowel which can serve as an anchor for a rubber band adapted to hold the model into in its selected position on the support. A support plate having a central slot extending vertically and adapted to be received by one of the pins may also be provided for a vertical adjustment of the quadrilateral frame.

These and other objects, advantages and features of the present invention will become more apparent from the detailed description made below in conjunction with the accompanying drawings.

DETAILED DESCRIPTION OF PREFERRED EMBODIMENT

Figure 1:
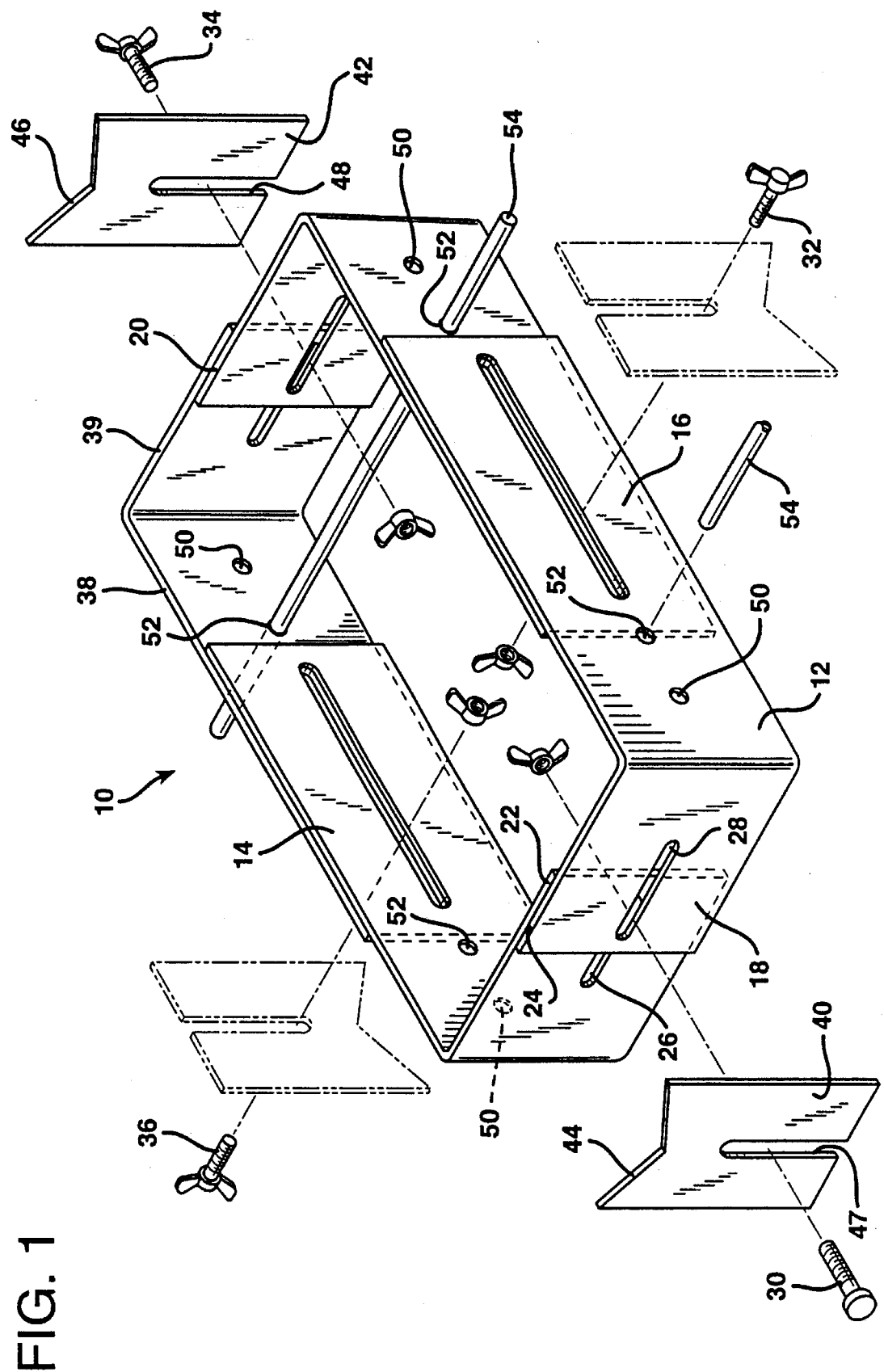
FIG. 1 illustrates a partially-exploded perspective view of the support of the present invention.

As illustrated in FIG. 1, a support 10 of the present invention includes a quadrilateral frame 12 having opposing side walls 14 and 16; as well as opposing end walls 18 and 20. As illustrated for the end wall 18, the side walls and the end walls are formed of overlapping portions 22 and 24 which have corresponding aligned slots 26 and 28 extending longitudinally of the respective wall portion.

In the illustrated form of the present invention, the quadrilateral frame 10 is formed of plexiglass or a metallic material; and is formed of four L-shaped pieces held together by respective pins 30, 32, 34, and 36.

The L-shaped pieces are essentially identical to ease manufacturing; and each includes an elongate side element 38 and a shorter end element 39. The elongate side elements are arranged to provide substantial overlapping portions with aligned slots; and pins 32 and 36 are placed within the aligned slots and held by respective wing nuts. Similarly, the end elements have their end surfaces overlapped with aligned slots having the respective pins 30 and 34 secured by respective wing nuts.

As would be understood, therefore, by one skilled in the art, the respective wing nuts can be loosened and the end walls or side walls can be adjusted in length; and then the wing nuts can be tightened to hold the quadrilateral frame in the chosen shape.

Additionally, to provide further adjustment capability, support plates 40 and 42 may be provided. As illustrated in FIG.1, the support plates are adapted to be arranged vertically, and include at one end surface V-shaped cradle portions 44 and 46; and have central slots 47 and 48 extending upwardly from the other end surface. In FIG. 1, the support plates 40 and 42 are shown to be positioned on the end walls 18 and 20; but the support plates also be positioned on the side walls and even inverted as shown in phantom in FIG. 1. The slots 47 and 48 extend through an end surface of the respective support plate and, therefore, a support plate can be secured in position by loosening a desired pin and sliding the slot of the support plate over the pin and then retightening the wing nut for the pin to hold the support plate in position.

The side elements 38 additionally have openings 50 and 52 which are adapted to be aligned with corresponding openings in an opposite side element 38. In this way, dowels 54 can be inserted through aligned openings for purposes to be set forth more fully below.

Figure 2:
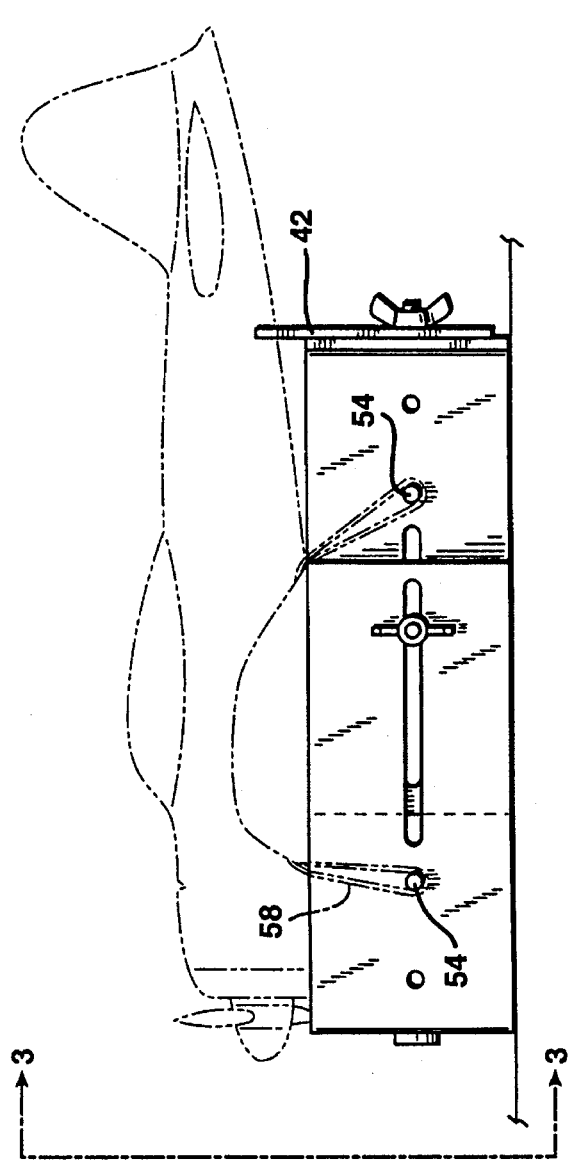
FIG. 2 illustrates a side view of the support of the present invention with an airplane model shown in phantom.
Figure 3:
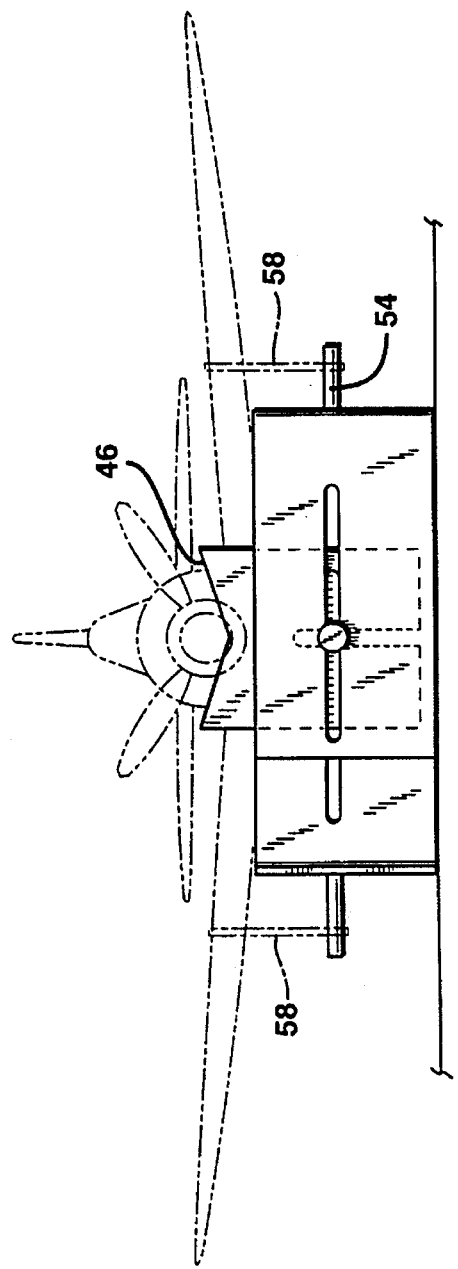
FIG. 3 illustrates is a view along line 3—3 of FIG. 2.

FIGS. 2 and 3 illustrate the support of the present invention configured to secure a model airplane in position. As illustrated in FIGS. 2 and 3, the side walls and end walls have been adjusted to accommodate the length of the model airplane; and a support plate 42 has been provided with its cradle 46 facing upwardly to seat the rear portion of the fuselage of the model airplane. Additionally, two dowels 54 have been inserted through the aligned openings 50 and 52 so that a rubber band 58 can be stretched between the dowels and over the wing of the airplane to securely hold the model in position. In this way, detailed and fine executions of various work tasks, such as painting, can be accomplished while the model is held in a reliable and stable position.

Figure 4:
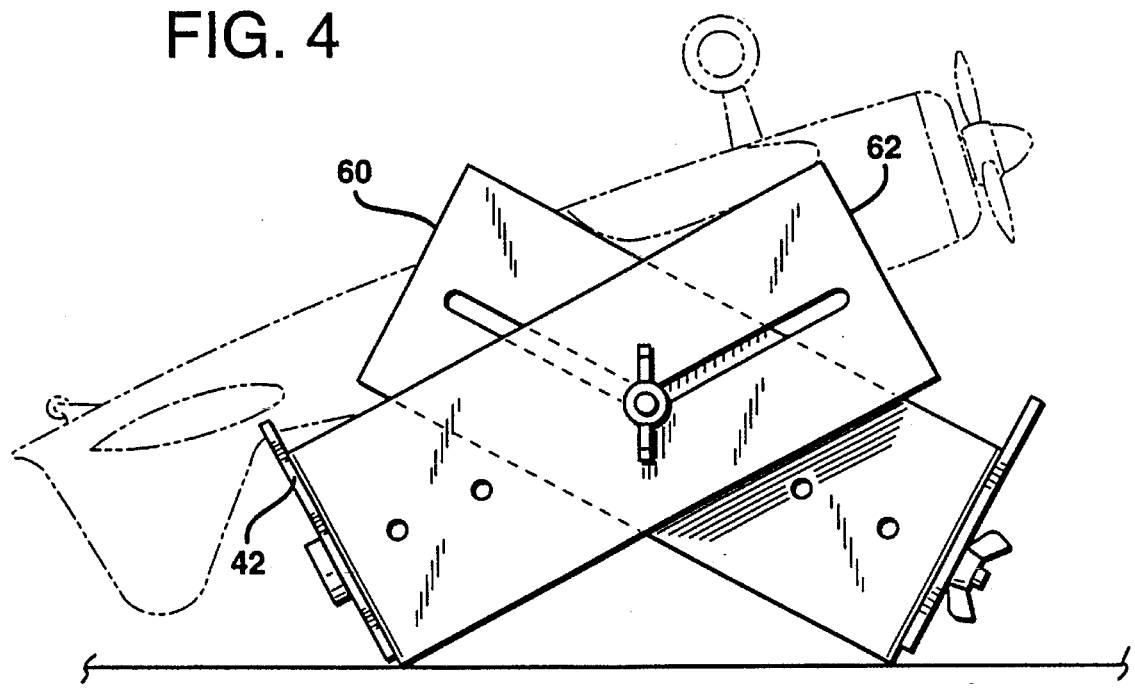
FIG. 4 illustrates a position of the support of the present invention with the pitch of the side walls modified to hold the airplane of FIG. 2.

FIG. 4 illustrates another manner of adjusting the support of the present invention to secure a model. As shown in FIG. 4, the pins 32 and 36 securing the side walls have been loosened and the side elements 38 have been pivoted relative one another to support the model in an inclined position to facilitate certain work tasks. In the configuration of the support of the present invention illustrated in FIG. 4, the support plate 42 is positioned with its cradle portion 46 pointed upwardly to secure the rear portion of the top surface of the fuselage of the model airplane; and the end surfaces 60 and 62 of the side elements 38 can serve to form a cradle for the wings of the airplane. In this way, the airplane can be held securely and in an inverted position enabling detailed tasks to be performed on the underside of the model reliably.

Figure 5:
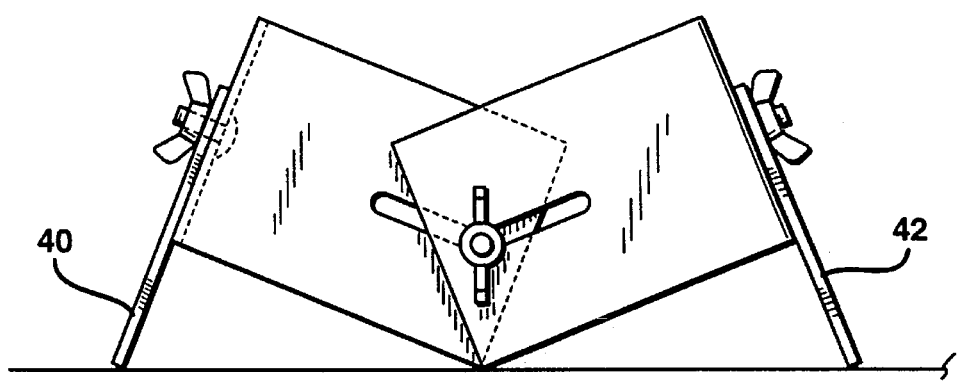
FIG. 5 illustrates the manner of varying the pitch of the end walls to provide a different holding orientation for a model.

FIG. 5 illustrates a configuration of the support of the present invention where the support plates 40 and 42 have the cradle portions 46 facing downwardly and serve to support the end elements 39 in a pivoted position. As can be envisioned from FIG. 5, this configuration provides a simple cradle to support a model in a working position.

As will be understood by one skilled in the art, a simple support which can be manufactured relatively inexpensively is provided which can be adjusted into many different positions to secure models of very different types reliably so that detailed and precise tasks can be performed with the model held securely in an appropriate position. The present invention has been described above in connection with a preferred embodiment, and the scope of the invention is not intended to be limited by any of the details described above, but by the attended claims.

What is claimed is:

1. An adjustable support for holding a model in a working position for a hobbyist, including a quadrilateral frame formed by respective L-shaped members having portions overlapping one another, said frame having opposing side walls and opposing end walls, said side walls each having respective portions of the L-shaped members overlapping one another and having elongate slots aligned with one another for receiving a pin and said end walls each having respective portions of the L-shaped members overlapping one another and having longitudinal slots aligned with one another for receiving another pin, each of the overlapping portions of the end walls and sidewalls are slidably and pivotally connected such that the length of said side walls or said end walls can be varied while the pitch of the overlapping portions can be adjusted to enable models of various designs to be held securely in position for the hobbyist.

2. The adjustable support as set forth in claim 1, said side walls having openings for receiving a dowel to serve as an anchor for a rubber band adapted to hold the model to said support.

3. The adjustable support as set forth in claim 2, further including at least one support plate having a central slot extending vertically and adapted to receive one of said pins for providing an adjustable vertical support surface for the model.

4. The adjustable support as set forth in claim 3, further including two of said support plates.

5. The adjustable support as set forth in claim 1, further including at least one support plate having a central slot extending vertically and adapted to receive one of said pins for providing an adjustable vertical support surface for the model.

6. The adjustable support as set forth in claim 5, further including two of said support plates.

7. An adjustable support for holding a model in a working position for a hobbyist, including a quadrilateral frame member formed by opposing side walls and opposing end walls, said side walls each having respective portions overlapping one another and having elongate slots aligned with one another for receiving a pin and said end walls each having respective portions overlapping one another and having longitudinal slots aligned with one another for receiving another pin, each of the overlapping portions of the end walls and sidewalls are slidably and pivotally connected such that the length of said side walls and said end walls can be varied while the pitch of the overlapping portions can be adjusted to enable models of various designs to be held securely in position for the hobbyist, further including at least one support plate having a central slot extending vertically and adapted to receive one of said pins for providing an adjustable vertical support surface for the model.

8. The adjustable support as set forth in claim 7, further including two of said support plates.

* * * * *